United States Patent [19]
Xu et al.

[11] Patent Number: 5,699,799
[45] Date of Patent: Dec. 23, 1997

[54] AUTOMATIC DETERMINATION OF THE CURVED AXIS OF A 3-D TUBE-SHAPED OBJECT IN IMAGE VOLUME

[75] Inventors: Beilei Xu, Chicago, Ill.; Jianzhong Qian, Princeton Junction, N.J.

[73] Assignee: Siemens Corporate Research, Inc., Princeton, N.J.

[21] Appl. No.: 622,076

[22] Filed: Mar. 26, 1996

[51] Int. Cl.[6] .................................................. A61B 5/00
[52] U.S. Cl. .......................... 128/653.1; 128/653.2; 378/4; 378/901; 324/306; 324/309; 382/128
[58] Field of Search .......................... 128/653.1, 653.2, 128/920, 922; 324/306, 309; 382/130–132, 128, 266, 288, 199; 378/4, 901

[56] References Cited

U.S. PATENT DOCUMENTS

| | | |
|---|---|---|
| 4,101,961 | 7/1978 | Reiber . |
| 4,630,203 | 12/1986 | Szirtes . |
| 4,843,629 | 6/1989 | Mischler et al. ............................ 382/6 |
| 4,920,573 | 4/1990 | Rhodes et al. ............................ 382/6 |
| 4,939,646 | 7/1990 | Essinger et al. . |
| 5,036,463 | 7/1991 | Abela et al. . |
| 5,303,706 | 4/1994 | Moshfeghi ............................ 128/653.2 |
| 5,323,111 | 6/1994 | Suzuki ............................ 324/309 |
| 5,361,763 | 11/1994 | Kao et al. ............................ 128/653.2 |
| 5,368,033 | 11/1994 | Moshfeghi ............................ 128/653.4 |
| 5,421,330 | 6/1995 | Thirion et al. ............................ 128/653.1 |
| 5,427,100 | 6/1995 | Higashi et al. ............................ 128/653.2 |
| 5,457,754 | 10/1995 | Han et al. ............................ 382/128 |
| 5,458,111 | 10/1995 | Coin ............................ 128/747 |
| 5,501,218 | 3/1996 | Usui ............................ 128/653.2 |
| 5,570,430 | 10/1996 | Sheehan et al. ............................ 382/128 |
| 5,601,084 | 2/1997 | Sheehan et al. ............................ 128/661.04 |
| 5,617,487 | 4/1997 | Yoneyama et al. ............................ 382/199 |

*Primary Examiner*—Marvin M. Lateef
*Assistant Examiner*—Shawna J. Shaw
*Attorney, Agent, or Firm*—Donald B. Paschburg

[57] ABSTRACT

A method is disclosed for automatically finding the true axis and the radius of cross sections of three dimensional tube-like shaped objects such as the left head ventricle, lung airways and blood vessels from 3-D transverse images constructed from known imaging techniques. The problem of finding the center axis of a 3-D tube-like shape is reduced to searches for the center points of its cross sections. The true axis of the tube-like shaped object is defined as the 3-D curve which connects all detected center points of all cross sections. Additionally, a method is disclosed for automatic determination of the center and the radius of each cross section of the tube-like shape, which may be irregular or incomplete, by analyzing the average intensity of the image intensity patterns in transverse image slices of the cross section. The curved axis detected by this method can then be used as the spatial reference to reslice the image volume for accurate medical related diagnosis or industrial non-destructive inspection.

30 Claims, 5 Drawing Sheets

AUTOMATIC DETERMINATION OF THE CURVED AXIS OF A 3-D TUBE-SHAPED OBJECT IN IMAGE VOLUME

BACKGROUND OF THE INVENTION

1. Field of the Invention

The present invention concerns a method for automatically determining the true curved axis of three dimensional tube-like shaped objects in a three dimensional image volume.

2. Description of the Prior Art

Medical related diagnoses and some industrial non-destructive inspections are often based on viewing image slices derived by known imaging techniques such as computed tomography (CT), magnetic resonance imaging (MRI), positron emission tomography (PET) or single photon emission computed tomography (SPECT). Computed tomography is a particular x-ray tomography method which produces axial transverse tomograms, i.e. images of body layers which are essentially perpendicular to the longitudinal axis of the body in medical related diagnosis. A computer tomograph computes a two dimensional (2-D) distribution of attenuation of a pencil thin x-ray beam moved linearly in the slice plane of the object. The numerical matrix of the 2-D attenuation distribution is converted into a black and white or color television image in which each image point (pixel) corresponds to a matrix element and different gray or color tones are assigned to different attenuation values.

With a computer tomogram, an object detail exactly corresponds to an image detail and not to a large number of object elements lying behind each other in the direction of radiation. Classical x-ray techniques, which produce a photographic recording of a two dimensional projection image of a three dimensional object area projected by the radiation cone into the image plane, suffer from blurred images of structures superimposed from different object depths. Computed tomography, however, avoids this superposition effect by only processing information on the layer, i.e. slice, of interest to the image.

Within the field of nuclear medicine imaging diagnostics, emission forms of computed tomography (ECT) provide slice images of the organ and tissue function, regional blood flow and regional metabolism by measuring emitted radiation in the areas of interest and generating an image corresponding to the emitted radiation measured. ECT with positron emitting isotopes is known as positron emission tomography (PET), and ECT with gamma photon emitting isotopes is known as single photon emission computed tomography.

The cuts from the image volume to produce the image slices are derived in part from a determined transverse image slice of the particular object. Traditional techniques resort to straight line or piece-wise straight line approximations to describe the curved axis of tube-like shaped objects such as human organs or body parts. Current medical related inspections and diagnoses of these tube-like shaped human body parts or organs, such as the head left ventricle, lung airways and blood vessels, are often made upon viewing image slices produced from a curve axis determined according to such traditional techniques. Consequently, traditional, straight line approximations for curved axis based image slices introduce undesirable inaccuracy and error into inspections and diagnoses from viewing such approximated image slices.

Detecting the center point of the cross section of an object or body part under conventional center of mass based methods are difficult where the intensity of the object's developed image is relied upon as an indication of mass. This method works where the intensity of the object in the image appears to be symmetric. In many imaging applications, however, the image of the object is often not symmetric or the intensity is not uniformly distributed along the circle. Moreover, the object of interest in the image may be partially missing or mixing with the surrounding background structures in the image because of defects, diseases, imperfect imaging conditions, or imperfect segmentation algorithms. All of these defects make the task of detecting the center point of the cross section even more difficult by using conventional center of mass approximation methods. Consequently, there is a need for an improved method for finding the center point of a near circular shaped cross section of an object or body part under the above mentioned real-world constraints.

Hence, it is an object of the present invention to provide a method for automatically defining the curved axis for curved tube-like shaped objects. More specifically, it is an object of the present invention to provide a method of automatic determination of the center and the radius of each cross section of a tube-liked shaped object which may be irregular or incomplete.

SUMMARY OF THE INVENTION

The present method provides determination of a curved axis of a tube-like shaped object inside an image volume which consists of a set of initial transverse image slices sliced in a direction perpendicular to the long axis of the volume. The initial transverse image slices have image intensity patterns which indicate the structure of the three dimensional tube-like shaped object in the image volume. Initially the image volume is divided into multiple piece-wise volume segments in the direction of the long axis of the image volume. A long axis of a transverse image of one of the piece-wise volume segments is detected for cutting the piece-wise volume segment along this long axis and obtaining a piece-wise longitudinal plane of the piece-wise volume segment. The new transverse image slices of the three dimensional tube-like shaped object are obtained by reslicing the image volume perpendicular to the straight line axis defined by straight center lines of a longitudinal cut of the piece-wise volume segments. The center point of the cross section of the tube-like shaped object revealed in the image intensity pattern of the transverse image slice is determined with an average intensity function defined as $(1/(2\Pi r)) \Sigma_m I_m$. A hypothetical center point is varied for a varying radius to determine average intensity for various hypothetical center points and various radius values. The hypothetical center point and radius where the average intensity function is an overall maximum indicates the location of the center point for the cross section of the three dimensional tube-like shaped object as shown by the transverse image slice.

The center point is located with the average intensity function for consecutive cross sections of the three dimensional tube-like shaped object for multiple transverse image slices. The consecutively determined center points define the curved axis of the three dimensional tube-like shaped object. The curved axis is used as a spatial reference for more accurate slicing of the three dimensional tube-like shaped object for inspections and diagnoses. The present method may be applied to three dimensional tube-like shaped human organs such as a heart left ventricle, lung airways or blood vessels.

The present method by determining centers of consecutive cross sections of the three dimensional tube-like shaped object for defining the curved axis provides greater accuracy than conventional linear approximation methods for determining the curved axis. The accuracy of the present method can be increased by generating thinner or more transverse image slices, thereby decreasing the distance between consecutive center points and defining the curved axis with more center points.

BRIEF DESCRIPTION OF THE DRAWINGS

FIGS. 3a–3d illustrate geometric details for obtaining the cross section from an image volume and a reference point according to the present method.

DETAILED DESCRIPTION OF THE INVENTION

Although the present invention can be used in many different applications where finding the true axis and radius of cross sections of tube-like shaped objects is useful, the present invention is especially suited for use with medical related imaging techniques such as computed tomography (CT), magnetic resonance imaging (MRI), photon emission tomography (PET) and single photon emission computed tomography (SPECT). Accordingly, the present invention will be described in conjunction with obtaining the true curved axis of tube-like shaped human organs or body parts from a 3-D transverse image volume.

Current straight line based approximation methods for determining the true axis of tube-like shaped human organs or body parts impart undesirable inaccuracies and errors into medical related inspections and diagnoses based on viewing image slices derived from such approximations. Moreover, conventional center of mass methods of searching for the center point of near circular shaped cross sections of human organs or body parts are limited, in part, due to existing medical imaging techniques producing imperfect image intensities distribution. Current imaging techniques produce images which often are not symmetric, the intensity is not uniformly distributed along the circle, or the image of the object may be partially missing or mixing with surrounding background structures because of defects, diseases, imperfect imaging conditions, or imperfect segmentation techniques. Consequently, an improved method for determining the true axis of tube-like shaped objects such as human organs or body parts will improve the accuracy of medical related inspections and diagnoses based on image slices determined from the true axis.

The present method reduces the problem of finding the true axis of a tube-like shaped object to defining a 3-D curve connecting the center points of cross sections of the tube-like shaped object. This new method searches for the center of a cross section by maximizing (where the object is bright) or minimizing (where the object is dark) a specially designed correlation function about a reference point. This new method is efficient and reliable even for images that reveal only part of a full circular-shaped object, namely a sector or a number of disconnected arcs of the circular shaped cross section. The direct applications of the present method in the medical field include positron emission tomography (PET) or single photon emission computed tomography (SPECT) myocardial perfusion studies, curved determination for lung airway related diagnosis, and blood flow studies from 3-D vessel images using computed tomography (CT) or magnetic resonance imaging (MRI).

Figure 1:
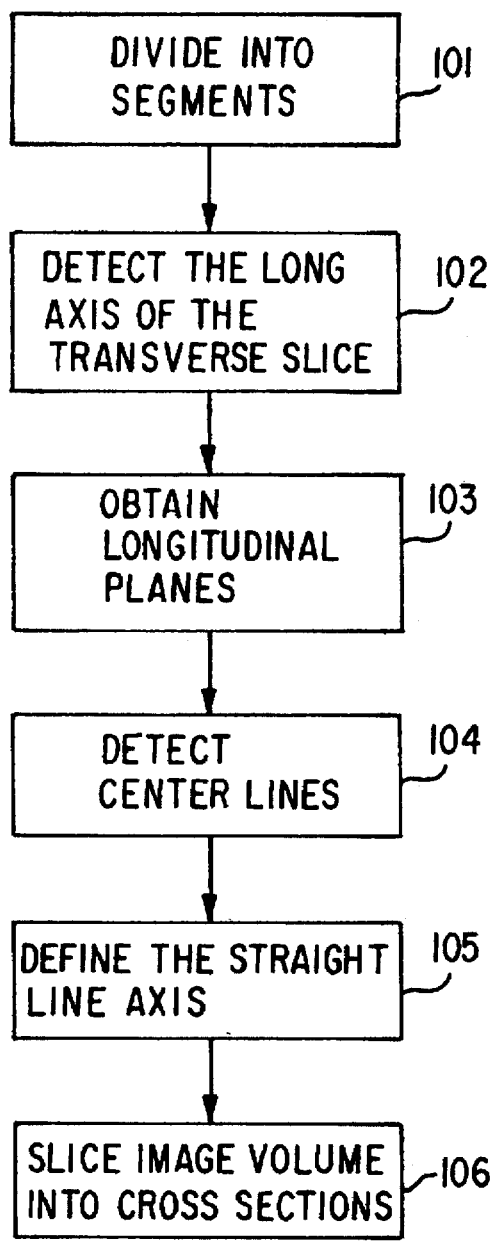
FIGS. 1–2 are flow charts of steps in accordance with the present method.
Figure 2:
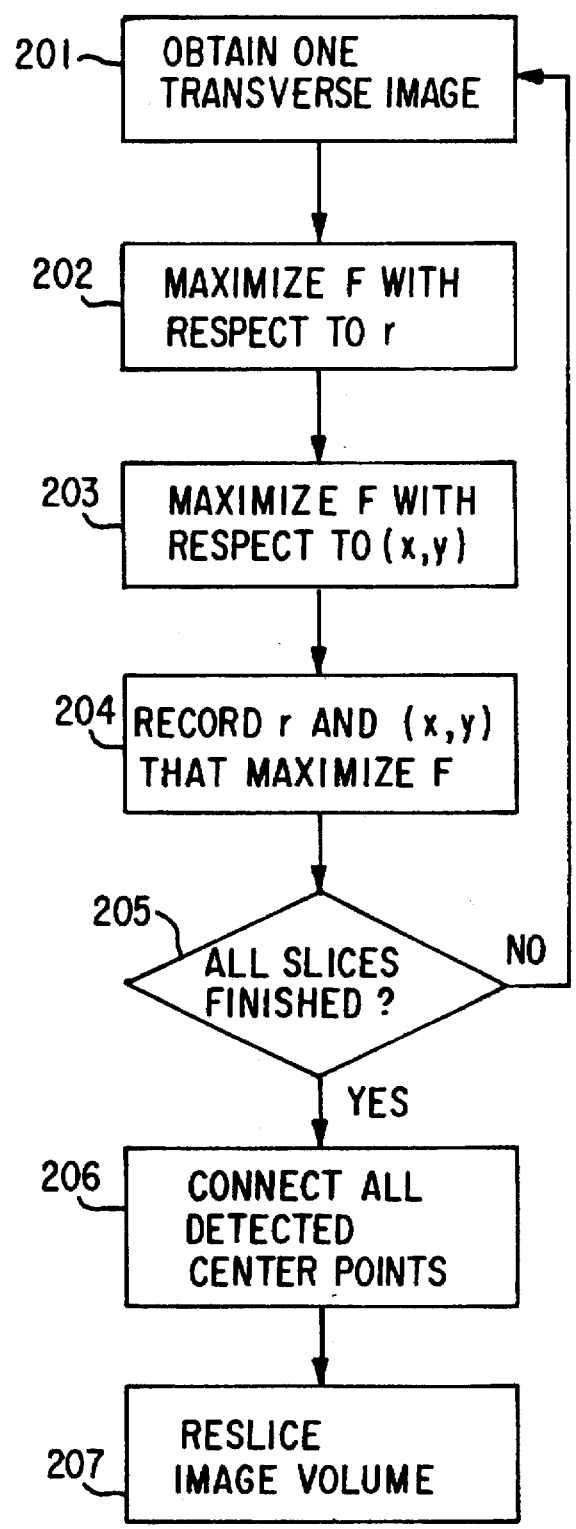
Figure 3A:
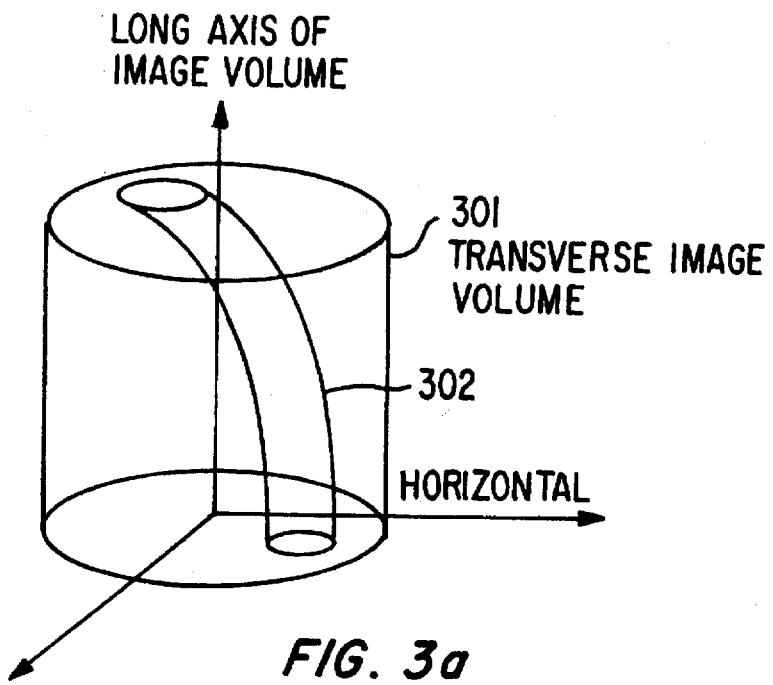

The steps for automatically determining the true axis and radius of cross sections of tube-like shaped objects are shown in the flow charts of FIGS. 1 and 2. The first step is to obtain cross sections from a 3-D image volume and to provide the starting searching point of each slice for the curved axis determination. Initially, the entire image volume is divided into several piece-wise volume segments in the direction of the long axis of the image volume 101. The number of segments or fragments developed will vary with different applications. The overall computation time can increase significantly with an increase in the number of piece wise volume segments. As an illustration, FIG. 3a shows a cylindrical shaped, transverse image volume 301 and a curved, tube-like shaped portion inside the image volume for which a curved axis is to be determined.

Figure 3B:
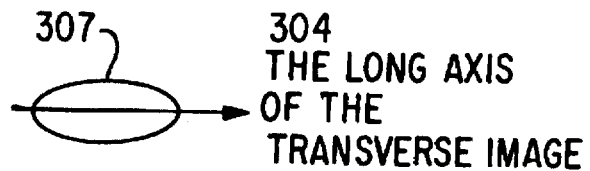
Figure 3C:
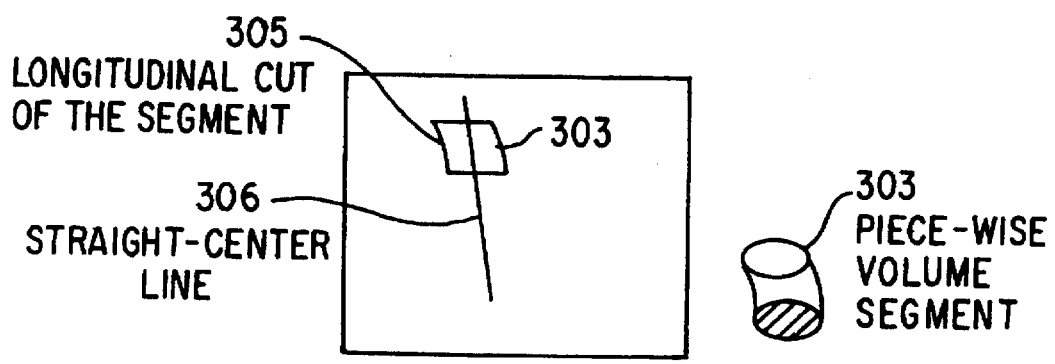

The long axis of the middle transverse image of each individual segment is detected 102. Piece-wise longitudinal planes 103 are obtained by cutting the volume segments along this long axis. Then the straight center lines 104 of the longitudinal cuts are determined. These steps are detailed in FIGS. 3b and 3c. When the center axis of the segment 302 to be divided is not aligned parallel to the direction of the long axis of the transverse image volume 301, the transverse image of the tube-like shaped object can appear as an elliptical or horseshoe like image 307.

The next step 105 requires defining the straight-line axis of one piece-wise segment by the straight center line 306 of the longitudinal cut 305 of the piece-wise segment 303. The cross section or transverse image slice is acquired by slicing the 3-D image volume perpendicular to the straight-line axis 106. The point where the straight-line axis and the transverse image slice intersects is used as a starting point for obtaining the radius and the center point of the transverse image slice. These steps are repeated for each transverse image (cross section) 201 to determine the radius or center points for defining the curve axis.

Figure 4:
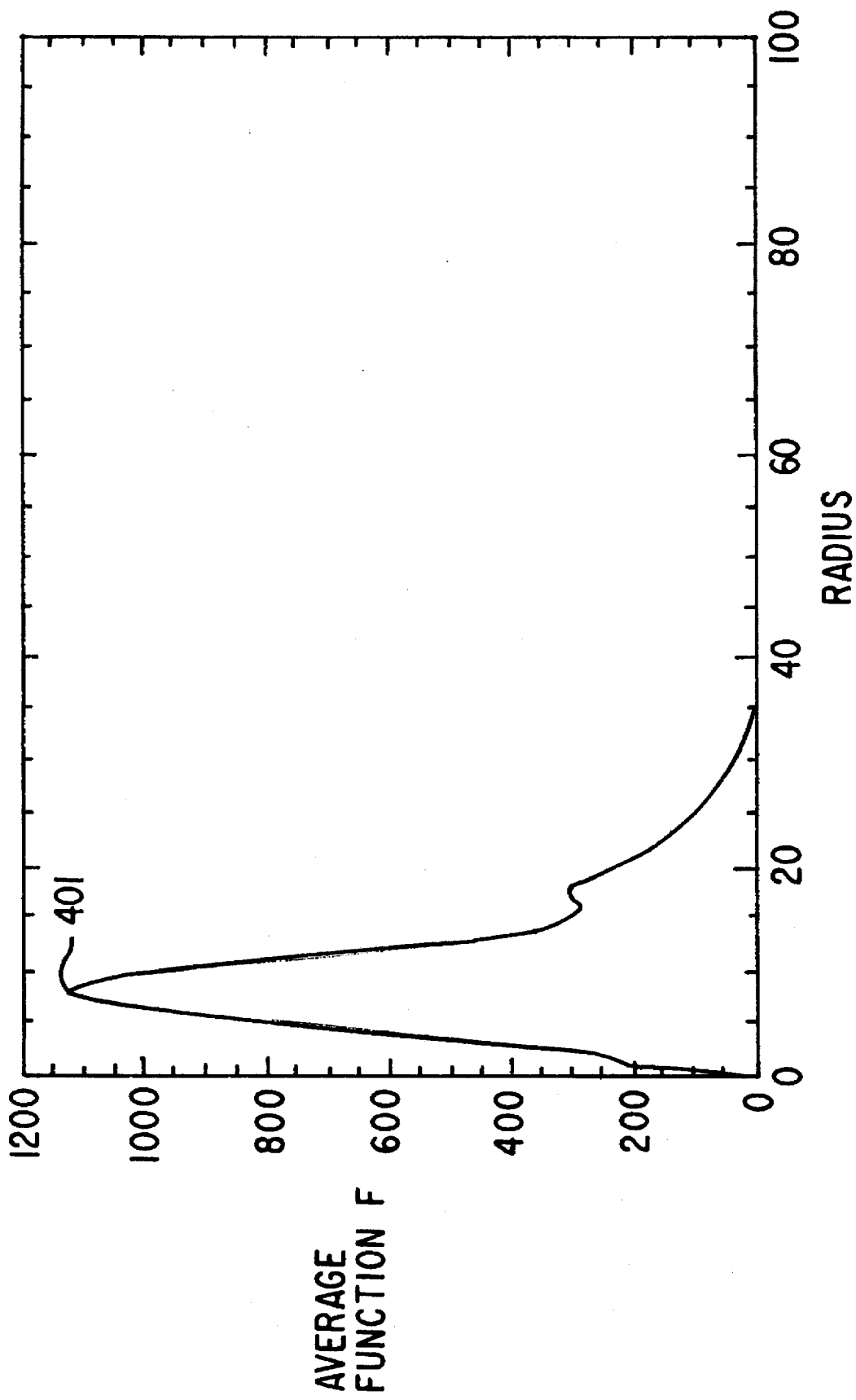
FIG. 4 is a graph demonstrating the variation of the average intensity function F over a varying radius r.
Figure 7:
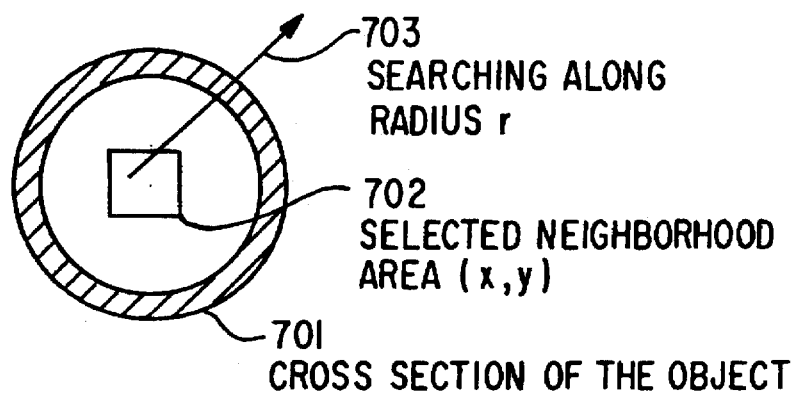
FIG. 7 is a drawing illustrating the average intensity function F being derived for a cross section of a geometric object.

Determination of the radius or center point of the sliced, transverse images or cross sections requires consideration of present day imaging characteristics. Under most practical situations, the image of a circular object is separated from its background by intensity or the image is already segmented out from its background. For purposes of the present method, an average intensity F of the pixels (produced by known imaging techniques) along an arbitrary circle of radius r centered around two dimensional coordinates (x,y) is defined as $F((x,y),r)=(1/(2\Pi r)) \Sigma_m I_m$, where the summation of the intensity I is over all the points m along the circle. If the hypothetical center (x,y) and the radius r approach those of the image circle ($x_o$, $Y_o$) and $r_o$, the average intensity function F will have a distinct signature with a maximum or a minimum. For example, the graph of FIG. 4 shows a distinct average intensity function F having a maximum 401 at a radius approaching 10. At a radius less then 10 or above 10, the average intensity function decreases from a maximum to indicate that the test circle defined by the center point (x,y) and radius r chosen do not provide the best image intensity fit with the imaged cross section. Consequently, the center and the radius of the circular object can be found by maximizing where the object is bright and minimizing where the object is dark with this intensity function F with respect to r 202 and (x,y) 203. Shown in FIG. 7 is a detail of the searching direction along radius r 703 about a selected neighborhood area (x,y) 702 for a cross section of an object 701. Due to the isotropic nature of the intensity function F, i.e. does not vary with direction, the searching result will not be biased by the non-uniformity of the intensity along the image circle. FIG. 7 illustrates that as the center point (x,y) 701 approaches the center point of the object 701 and the radius r approaches the radius of the object 701, the image area defined by (x,y) will match the cross section area of the object: the average intensity function F will be a distinct overall maximum.

Figure 5:
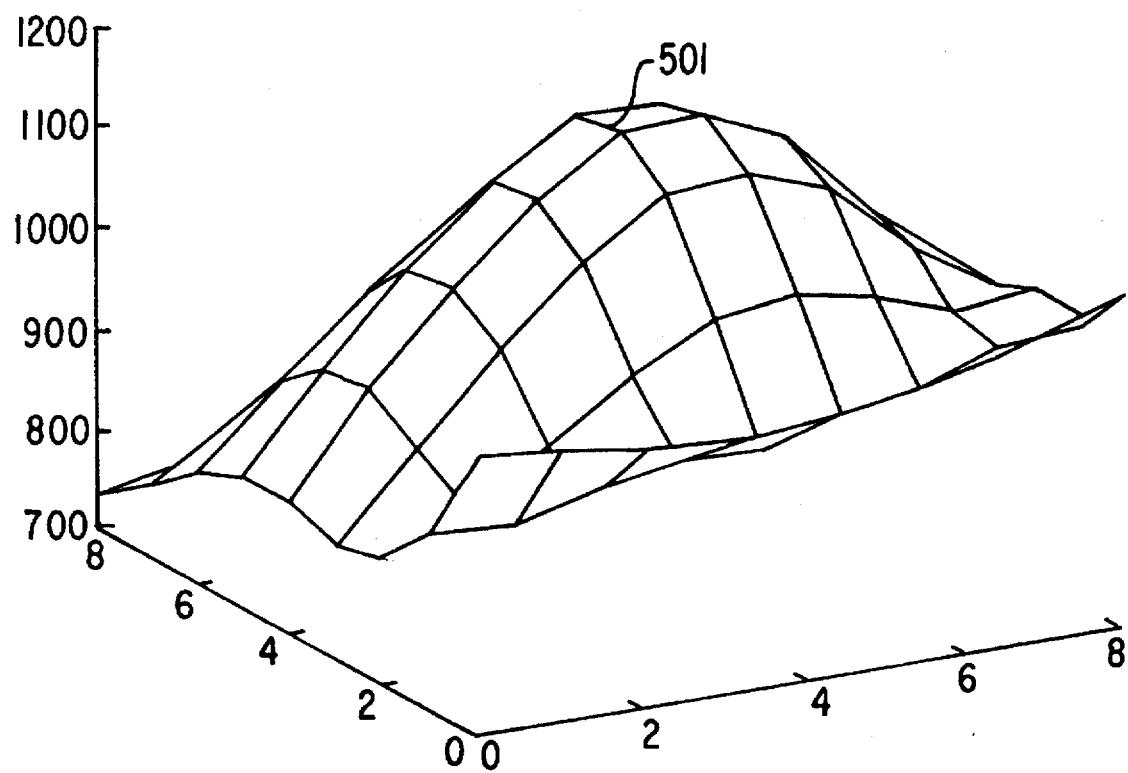
FIG. 5 is a 3-D plot of the average intensity function F varying with the position of the center points within a 9×9 neighborhood area.
Figure 6:
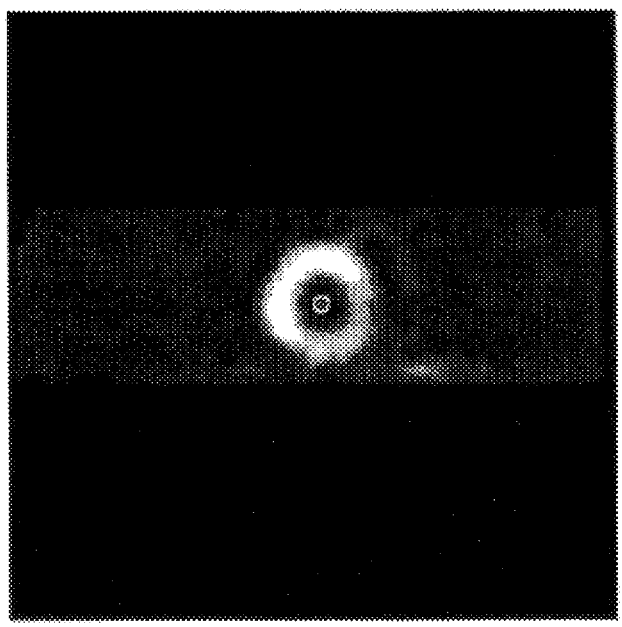
FIG. 6 is a cross section of the left ventricle of the human heart showing a center point of the cross section determined in accordance with the present method.

Given a reasonable starting point of cross sections from the 3-D image volume, as discussed with respect to steps 101 through 102, the average intensity function F will generally yield an accurate determination of the center and the radius of the circle. For each hypothetical center point, the intensity function F is first maximized/minimized again with respect to the position of the center points within the user defined neighborhood of the reference point as shown in FIG. 5, where the selected neighborhood area is a 9×9 area. The true center point of the image is determined to be the one which results in the overall maximum value in F, shown in FIG. 5 to be the highest point 501 of the 3-D graph. Illustrated in FIG. 6 is a cross section of the left ventricle of a heart, where the hot spot in the center represents the center point of the cross section detected by the maximum of the intensity function F.

The center point determined for a preceding cross section or transverse slice is preferably used as the starting point (x,y) for the succeeding transverse slice to find the centers of a sequence of transverse slices of a tube-like shaped object. The radius r and center point (x,y) values which produce the maximum intensity function F value are recorded for each transverse slice 204. When all the slices 205 have been maximized with respect to the intensity function F, the series of center points of the consecutive transverse slices are connected to generate a curve axis for the tube-like shaped object of interest 206. The generated curve axis is then used for re-slicing the image volume of the object of interest for accurate diagnosis or inspection.

It is assumed that all processing steps in the description above are carried out automatically, by using a computer (not shown). Persons skilled in the art know how to program a computer to perform the required steps.

It should be understood that the embodiment described herein is merely exemplary and that a person skilled in the art may make many variations and modifications to this embodiment utilizing elements functionally equivalent to those described herein. Any and all such variations or modifications as well as others which may become apparent to those skilled in the art, are intended to be included within the scope of the invention as defined by the appended claims.

What is claimed is:

1. In a method for determining a curved axis of a three dimensional tube-like shaped object in an image volume utilizing imaging techniques producing transverse image slices of said image volume with image intensity patterns indicative of the structure of said three dimensional tube-like shaped object and said image volume, in combination therewith the improvement comprising the steps of:

obtaining a plurality of transverse image slices of said three dimensional tube-like shaped object from slicing said image volume in accord with the configuration of said three dimensional tube-like shaped object;

locating center points of consecutive cross sections of said three dimensional tube-like shaped object from each of said plurality of transverse image slices in accord with said image intensity patterns of said plurality of transverse image slices of said three dimensional tube-like shaped object; and, defining a curved axis of said three dimensional tube-like shaped object with said center points of said consecutive cross sections.

2. The method of claim 1, wherein said three dimensional tube-like shaped object is a human organ.

3. The method of claim 2, wherein said human organ is one of a left heart ventricle, a lung airway, and a blood vessel.

4. The method of claim 1, further including the step of using said curved axis as a spatial reference for re-slicing said image volume for inspection and diagnosis of said three dimensional tube-like shaped object.

5. The method of claim 4, wherein said inspection and diagnosis is performed in conjunction with at least one of computed tomography, positron emission tomography, single photon emission computed tomography, and magnetic resonance imaging.

6. The method of claim 1, wherein said step of obtaining a plurality of transverse image slices includes dividing said image volume into a plurality of piece-wise volume segments in the direction of a long axis of said image volume.

7. The method of claim 6, wherein said step of obtaining a plurality of transverse image slices includes detecting a long axis of the middle transverse image of each of said plurality of piece-wise volume segments.

8. The method of claim 7, wherein said step of obtaining a plurality of transverse image slices includes obtaining piece-wise longitudinal planes of each of said plurality of piece-wise volume segments by cutting each of said plurality of piece-wise volume segments along said long axis of said middle transverse image of each of said plurality of piece-wise volume segments.

9. The method of claim 8, wherein said step of obtaining a plurality of transverse image slices includes defining a straight line axis for each of said plurality of piece-wise volume segments with straight center lines of longitudinal cuts of said each of said plurality of piece-wise volume segments.

10. The method of claim 9, wherein said step of obtaining a plurality of transverse image slices includes slicing said three dimensional image volume perpendicular to said straight line axis.

11. The method of claim 10, wherein said step of locating center points of consecutive cross sections includes utilizing where said straight line axis for each of said plurality of piece wise volume segments and said transverse image slice of said piece-wise volume segments intersect as a starting point for locating said center points.

12. The method of claim 11, wherein said step of locating center points of consecutive cross sections includes obtaining a maximum average intensity from said image intensity patterns for each of said plurality of transverse image slices from a point and for a radius corresponding to each of said center points of consecutive cross sections.

13. The method of claim 12, wherein said average intensity function is defined as $(1/(2\Pi r)) \Sigma_m I_m$.

14. A method for obtaining a transverse image slice of and a center point and radius of a cross section of a three dimensional tube-like shaped object in an image volume, utilizing imaging techniques producing transverse image slices of said image volume with image intensity patterns indicative of the structure of said three dimensional tube-like shaped object and said image volume, comprising the steps of:

dividing said image volume into a plurality of piece-wise volume segments in the direction of a long axis of said image volume;

detecting a long axis of a transverse image of one of said plurality of piece-wise volume segments;

obtaining piece-wise longitudinal planes of said one of said plurality of piece-wise volume segments from cutting said one of said plurality of piece-wise volume segments along said long axis of said transverse image;

slicing said image volume perpendicular to a straight line axis defined with straight center lines of a longitudinal cut of said one of said plurality of piece-wise volume segments for obtaining said transverse image slice of said three dimensional tube-like shaped object; and, locating a center point of said transverse image slice where a maximum average intensity occurs from an image intensity pattern for said transverse image slice from a point and for a radius corresponding to said center point.

15. The method of claim 14, wherein said average intensity is defined by the function $(1/(2\Pi r)) \Sigma_m I_m$.

16. The method of claim 14, wherein said three dimensional tube-like shaped object is a human organ.

17. The method of claim 16, wherein said human organ is one of a left heart ventricle, a lung airway, and a blood vessel.

18. The method of claim 14, further including the step of finding consecutive center points for each of a consecutive plurality of said transverse image slice for all of said plurality of piece-wise volume segments for defining a curved axis of said three dimensional tube-like shaped object with said consecutive center points.

19. The method of claim 18, further including the step of using said curved axis as a spatial reference for re-slicing said image volume for inspection and diagnosis of said three dimensional tube-like shaped object.

20. The method of claim 19, wherein said inspection and diagnosis is performed in conjunction with at least one of computed tomography, positron emission tomography, single photon emission computed tomography, and magnetic resonance imaging.

21. A method for determining a center point of a cross section of a three dimensional tube-like shaped object from a transverse image slice of said three dimensional tube-like shaped object having an image intensity pixel pattern indicative of the structure of said tube-like shaped object and said image volume, comprising the steps of:

choosing a hypothetical center point as the starting point for determining said center point;

obtaining an average intensity of said cross section of said three dimensional tube-like shaped object from said image intensity pixel pattern about said hypothetical center point for varying radius values; and, varying said hypothetical center point with said varying radius for determining a maximum of said average intensity indicating where said varying hypothetical center point corresponds to said center point.

22. The method of claim 21, wherein said average intensity is defined by the function $(1/(2\Pi r)) \Sigma_m I_m$.

23. The method of claim 21, wherein said three dimensional tube-like shaped object is a human organ.

24. The method of claim 23, wherein said human organ is one of a left heart ventricle, a lung airway, and a blood vessel.

25. The method of claim 21, wherein said image intensity pixel pattern is produced by an imaging technique selected from the group consisting of computed tomography, positron emission tomography, single photon emission computed tomography, and magnetic resonance imaging.

26. A method for determining a center point of a cross section of a curved, three dimensional tube-like shaped object, comprising the steps of:

creating an image intensity pixel pattern of said cross section indicating a structure of said curved, three dimensional tube-like shaped object;

maximizing bright portions of said structure in said image intensity pixel pattern;

minimizing dark portions of said structure in said image intensity pixel pattern; and, locating said center point at a reference point with a radius about which the average intensity of pixels of said maximizing and said minimizing is an overall maximum.

27. The method of claim 26, wherein said average intensity of pixels is defined by the function $(1/(2\Pi r)) \Sigma_m I_m$.

28. The method of claim 27, wherein said three dimensional tube-like shaped object is a human organ.

29. The method of claim 27, wherein said human organ is one of a left heart ventricle, a blood vessel, and a lung airway.

30. The method of claim 26, wherein said step of creating an image intensity pixel pattern is by an imaging technique selected from the group consisting of computed tomography, positron emission tomography, single photon emission computed tomography, and magnetic resonance imaging.

* * * * *